Dec. 5, 1944.   C. A. JAHREIS   2,364,366
FRACTIONAL REMOVAL OF LIQUID FROM LIQUID-SOLID SUSPENSIONS
Filed Nov. 13, 1941   5 Sheets-Sheet 1
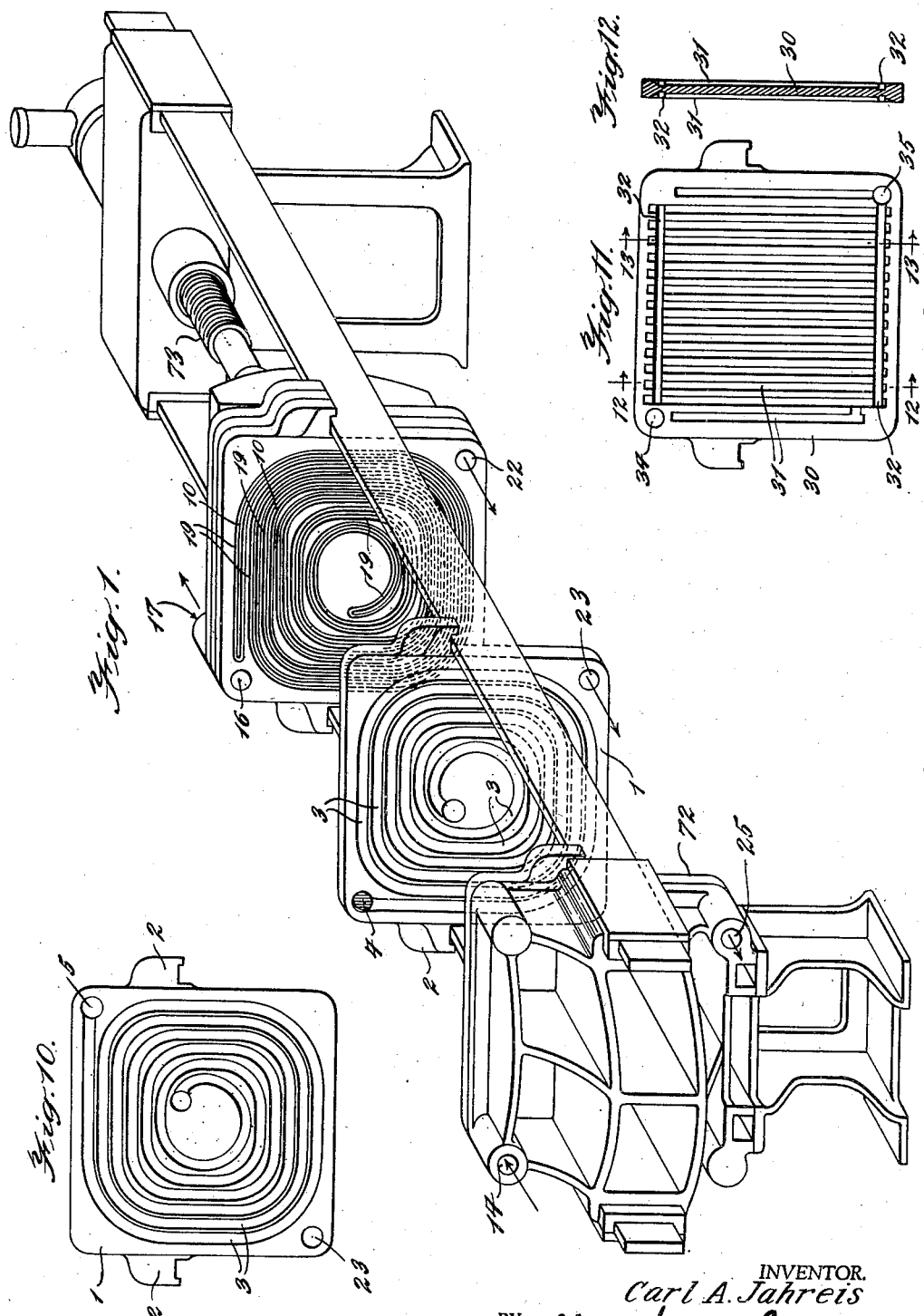
INVENTOR.
Carl A. Jahreis
BY
ATTORNEYS

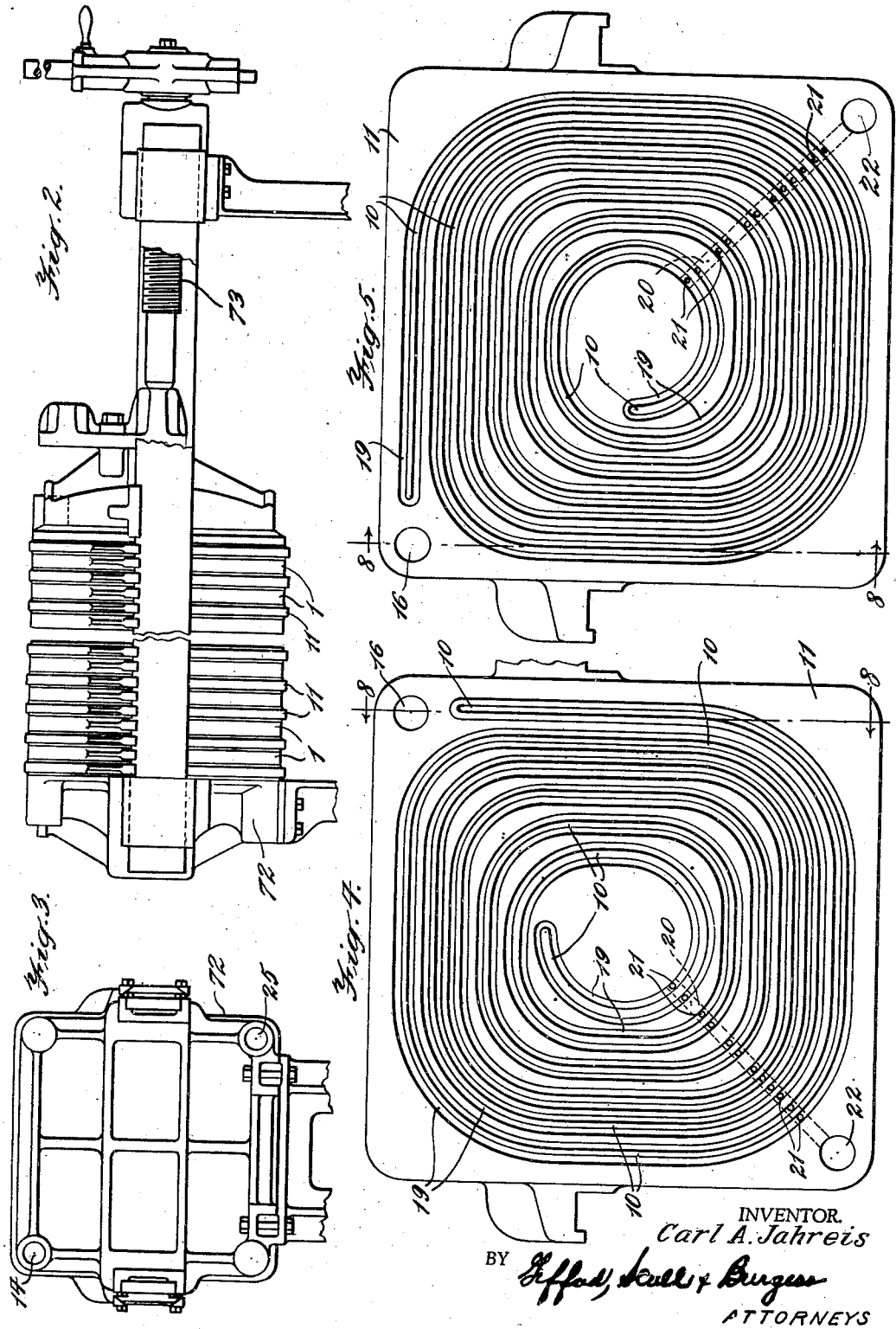

Dec. 5, 1944. C. A. JAHREIS 2,364,366
FRACTIONAL REMOVAL OF LIQUID FROM LIQUID-SOLID SUSPENSIONS
Filed Nov. 13, 1941 5 Sheets-Sheet 3
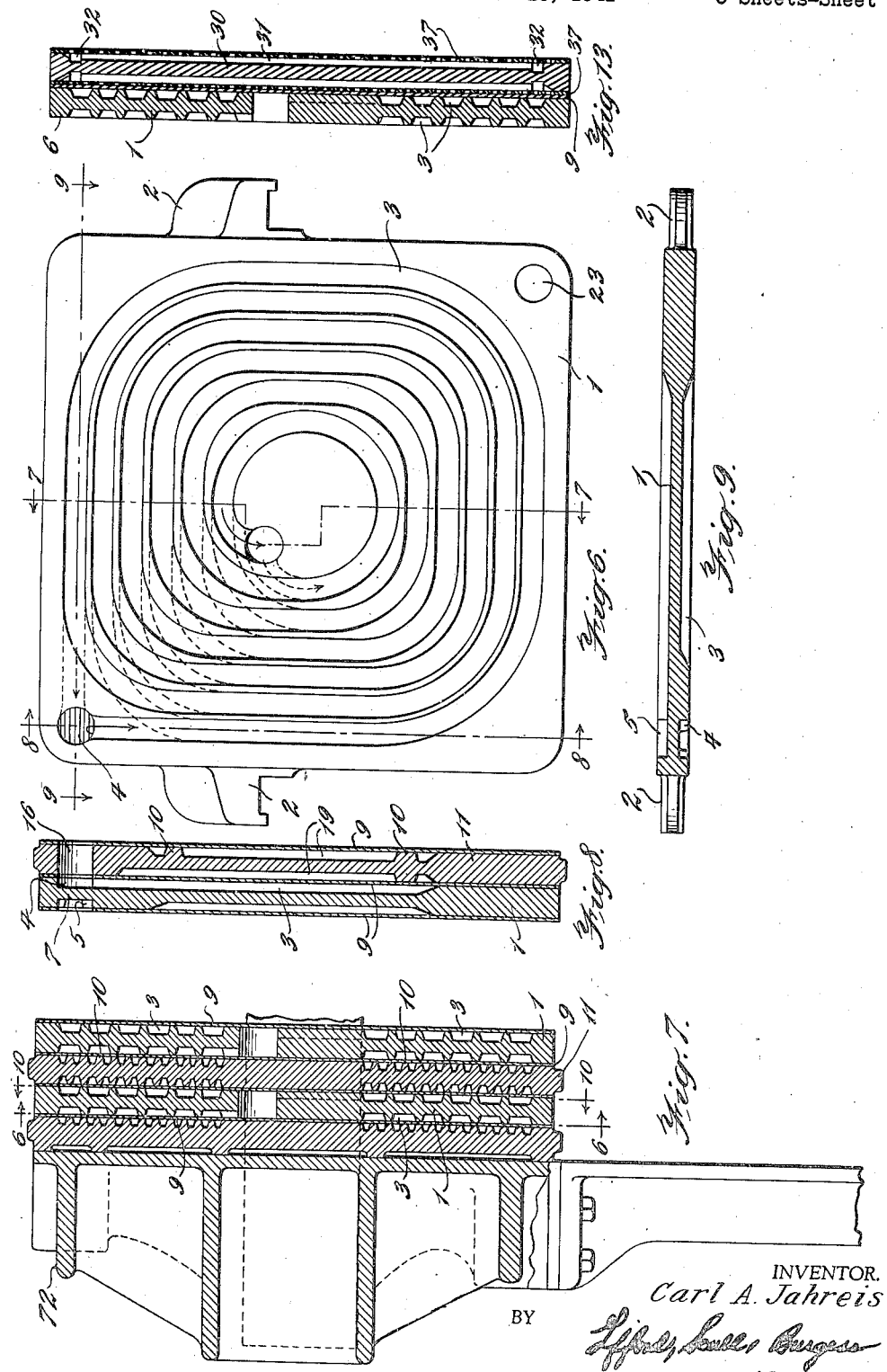
INVENTOR.
Carl A. Jahreis.
BY
ATTORNEYS

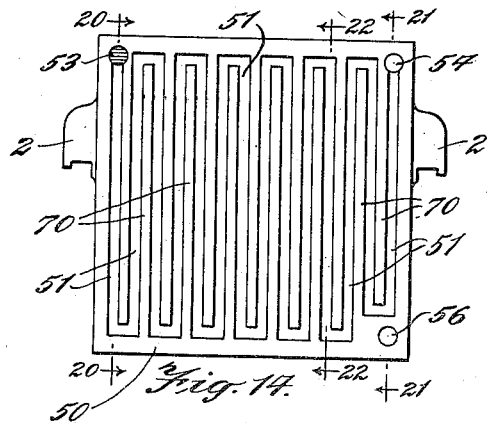

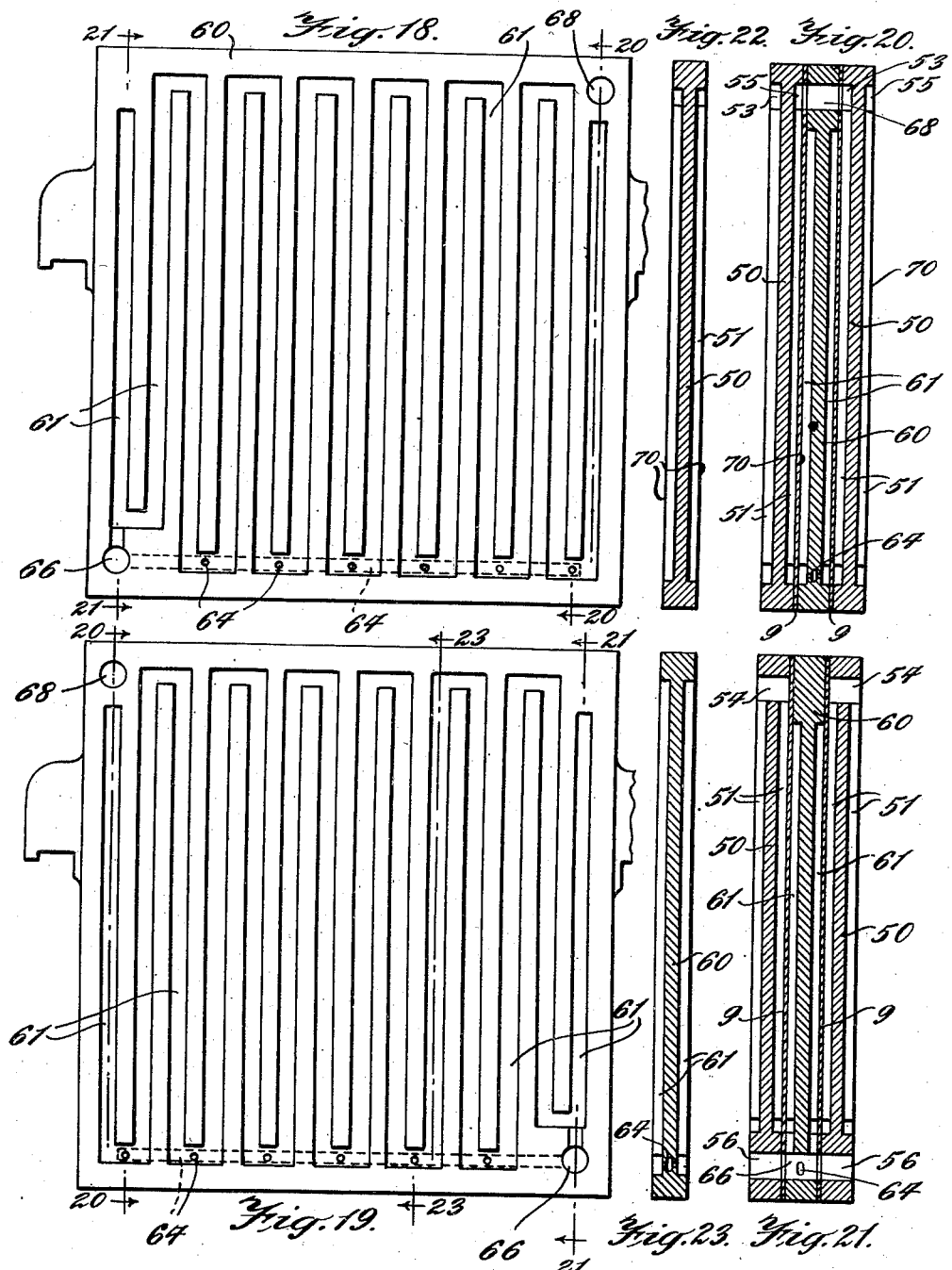

Patented Dec. 5, 1944

2,364,366

UNITED STATES PATENT OFFICE 2,364,366

FRACTIONAL REMOVAL OF LIQUIDS FROM LIQUID-SOLID SUSPENSIONS

Carl A. Jahreis, Leonia, N. J., assignor to John L. Hutton, trading as T. Shriver & Company, Harrison, N. J.

Application November 13, 1941, Serial No. 419,037

10 Claims. (Cl. 210—188)

This invention relates to the fractional or partial separation of a liquid from a suspension of solids therein.

One of the purposes of such a process is to thicken a suspension of solids in liquids. This thickening is conventionally carried out by a settling operation dependent upon gravity. In such an operation the fractional removal of the liquid is accomplished indirectly, that is to say, the increase in concentration of the solids occurs by concentrating these solids in a portion of the liquid whereby the ratio of solids to liquids in that portion is increased and consequently the ratio of liquids to solids decreased. This is the essential operation which characterizes the conventional process known as thickening as applied to the suspension of soilds in a liquid. Another purpose of the fractional removal of liquid from a suspension of solids in a liquid is to remove soluble material from insoluble solids mixed therewith, as for example, the removal of a water soluble salt from a mixture thereof with a water insoluble solid by washing with water. In such a process the mixture of water soluble and insoluble salts are mixed with a desired volume of water for the purpose of dissolving the water soluble salt and settling in the above conventional manner is then adopted in order to segregate the insoluble solids from the mother liquor.

The above described processes have the fundamental disadvantage that they are dependent upon the principle that the rate at which the proportion of solids to liquid is increased is dependent upon the rate at which said solids settle from the liquid by the action of gravity. Where the density of said solids is relatively great in relation to that of the liquid, such settling is reasonably rapid, although even in such a case the settling may be very slow if the solids are finely divided. Where, however, there is relatively little difference between the density of the solids and liquids the rate of settling is so slow as to render the operation too expensive for advantageous commercial use. Another disadvantage of the conventional process above described is that the apparatus required therefor occupies a relatively large volume and requires relatively large floor space.

The objects of the present invention include the following, as applied to the partial or fractional separation of liquid from a suspension of solids:

(a) To devise means which are independent of the rate of settling.

(b) To devise means in which liquid is partially separated from a suspension of solids in that liquid by the principle of filtration, as contrasted with the principle of settling.

(c) To devise means involving apparatus of the filter press type which is compact and for a given capacity occupies a relatively small volume and requires relatively small floor space.

(d) To devise means which will effectively operate on a suspension in liquids of solids which either cannot be effectively settled from said liquid at all or only with difficulty.

(e) To devise means which can be effectively and economically applied to the treatment of corrosive materials.

In accordance with the apparatus aspect of the present invention, apparatus of the filter press type is employed in which there is provided a series of plates arranged in face-to-face relation and assembled in a filter press skeleton. Each alternate plate may be identified as a conduit plate and each of these conduit plates has therein a single continuous channel partly defined by walls terminating in edges. The axis of this channel is preferably parallel to the face of said plate, but strict parallel relationship is not essential.

A filter medium, which may, for example, be a conventional type of filter cloth, is provided which when laid across the face of the plate and maintained in sealing contact with the edges of the channel is thereby adapted to form a single continuous conduit which is defined by the walls of the channel and one surface of said filter medium. Between each pair of conduit plates there is interposed a plate which may be identified as a drainage plate which serves to receive filtrate from the said continuous conduit. The conduit and drainage plates are therefore arranged in face-to-face relation and side-by-side in the filter press skeleton with the filtering medium interposed between adjacent faces of each conduit plate and drainage plate. When the series of plates thus assembled is pressed together the filtering medium seals the edges of the continuous channel in the conduit plates and, as previously stated, forms a continuous conduit through which a suspension of solids in a liquid may be continuously passed. During this passage liquid filters through the filtering medium and is received by and may be drawn off from the drainage plates, and the rate of passage of the suspension through the conduit is controlled in relation to the composition of the suspension or slurry so as to effect a partial or fractional filtration or removal of liquid from said slurry, and to prevent the formation of a filter cake or layer of solids on the surface of the filtering medium. In other words, the velocity at which the suspension is passed through the conduit is controlled so as to sweep the surface of the filtering medium clear of any solid matter which may tend to collect thereon. The suspension is thus capable of division into two parts, a partial filtrate and a thickened suspension, which are drawn off from suitable ports in the conduit plates and drainage plates, respectively. The drainage plate may assume various forms; it may have a continuous channel therein which is substantially a mirror image of the channel in the conduit plate. On the other hand, while it is necessary for the conduit plate to have a single continuous channel therein, such requirement does not apply to the drainage plate and it is only necessary that the structure of the latter be such as to provide a suitable reservoir to properly receive and discharge the filtrate from the channel in the conduit plate and to be provided with means to maintain the filtering medium in sealing contact with the edges of the channels in the conduit plates.

In accordance with one form of the apparatus of the present invention there is provided a standard Shriver filter press skeleton carrying conduit and drainage plates as above described.

Each conduit plate contains a spiral groove or channel which starts at one corner, spirals to the center, passes through the center of the plate and spirals outward on the other side or face of the plate to the same corner. Each drainage plate has a similar structure except that the channel therein is a mirror image of the channel in the conduit plate and preferably has in the center of said channel a continuous rib the purpose of which is to prevent bulging of the filter medium into the drainage channels.

It will be understood that the invention is not limited to any special form of channel. The spiral form has been found advantageous in connection with plates which can be cast from metals of various sorts. Where one is dealing with materials which cannot be cast, as for example wood, a series of substantially straight and parallel channels may be formed in or on the plate connected at the ends thereof to provide the necessary continuity. In both designs the purpose is to provide velocity channels in the conduit plates which insure the flushing away of solid deposits on the filter medium and the prevention of cake formation.

The unit is assembled with any desired number of conduit plates and a drainage plate between each pair of conduit plates, and the assembly is closed and pressed together as in the corresponding assembly of a filter press. Means are provided to supply a suspension of solids in a liquid to one end of the conduit in each plate and to withdraw thickened material from the other end of that conduit, and means are also supplied to withdraw filtrate from each drainage plate. All of the conduit plates may, if desired, be arranged in series so that the suspension will pass in series through the conduits of all the conduit plates, or all of the conduit plates, if desired, may be connected in parallel. Moreover, any desired series-parallel relationship of various groups of conduit plates may be established. Thus the apparatus is capable of great flexibility to provide for the handling of diverse materials under diverse conditions.

The principles of the invention will be defined in the claims and illustrative embodiments of the numerous forms thereof will be described in connection with the accompanying drawings, in which:

Fig. 1 is an isometric assembly view showing the conduit and drainage plates arranged in a conventional filter press skeleton;

Fig. 2 is a side elevation of the assembly;

Fig. 3 is an end view;

Fig. 4 is a view of one face of a spiral form of drainage plate showing the rib running longitudinally, or vertically, of the channel therein;

Fig. 5 shows the other side of the drainage plate shown in Fig. 4;

Fig. 6 shows one face of a conduit plate having a spiral channel therein and is taken on the line 6—6 of Fig. 7;

Fig. 10 shows the other face of the conduit plate shown in Fig. 6 and is taken on the line 10—10 of Fig. 7;

Fig. 7 is a sectional view of an assembly of two conduit plates and two drainage plates, taken on the line 7—7 of Fig. 6;

Fig. 8 is a section on the line 8—8 of Fig. 6 and on the lines 8—8 of Figs. 4 and 5, showing a section through the conduit plate of Fig. 6 and also through the adjacent drainage plates shown in Figs. 4 and 5.

Fig. 9 is a section through the conduit plate shown in Fig. 6 and is taken on line 9—9 of Fig. 6;

Figs. 11, 12, 14, 15 and 18 to 23 are views showing modified forms of conduit and drainage plates which may be used in cases where these plates are made of wood;

Fig. 11 shows one face of one of said modified forms of drainage plate;

Fig. 12 is a section on line 12—12 of Fig. 11;

Fig. 14 shows one face of the said modified form of conduit plate;

Fig. 15 shows the reverse face of the conduit plate shown in Fig. 14, these views showing a type of channel which may be used in conduit plates made of wood.

Figs. 18 and 19 show the reverse faces of a drainage plate the channels of which (unlike those of Figs. 11 and 12) are the mirror image of the channels in the conduit plate shown in Figs. 14 and 15. In such case it is not necessary to use a screen between the filter medium and the drainage plate to secure the necessary sealing action.

Fig. 22 is a section on line 22—22 of Fig. 14;

Fig. 23 is a section on line 23—23 of Fig. 19;

Figs. 20 and 21 are sectional views of an assembly of the drainage plate shown in Figs. 18 and 19 with two adjacent conduit plates of the type shown in Figs. 14 and 15;

Fig. 20 is a section on lines 20—20 of Figs. 18 and 19 and lines 20—20 of Figs. 14 and 15.

Fig. 21 is a section on lines 21—21 of Figs. 18 and 19 and lines 21—21 of Figs. 14 and 15.

Fig. 13 is a sectional view on line 13—13 of Fig. 11 and line 7—7 of Fig. 6 showing a conduit plate as illustrated in Fig. 6, used in conjunction with a drainage plate shown in Figs. 11 and 12 with a screen interposed between the filter cloth or medium and the drainage plate to assist in sealing the filter cloth or medium to the edges of the channel in the conduit plate, this screen being employed in this assembly because the drainage plate does not have channels which are substantially the mirror image of those in the conduit plate.

Fig. 16 shows one face of a still further modified form of drainage plate; and

Fig. 17 is a sectional view showing an assembly of a conduit plate of the type shown in Fig. 6 with a drainage plate of the type shown in Fig. 16, this section being taken on the line 17—17 of Fig. 16 and the line 8—8 of Fig. 6. In this case it is also advisable to interpose a screen between the drainage plate and the filter medium because the drainage plate does not have a channel which is substantially the mirror image of the conduit plate.

There will first be described a preferred type of conduit plate and drainage plate and the assembly thereof, and for this purpose reference is made to Figs. 4, 5, 6, 7, 8 and 9.

Referring to Fig. 6, the plate 1 having conventional handles 2 is made of cast metal, e. g. iron, and is provided with a channel or groove 3 which starts at the port 4 at upper left hand corner, as shown, and spirals to the center. The axis of this channel may, as specifically shown, be conveniently made parallel to the face of the plate. Near the center of the plate the axis of the channel undergoes a right-angle turn, passes through the plate 1, emerges on the other side, spirals outwardly and terminates at the port 5 at the same corner of the plate as the port 4, as shown in Fig. 10, these ports being separated by a web 7 of metal, as most clearly shown in Fig. 8 which illustrates an assembly of the conduit plate shown in Figs. 6 and 10 with the drainage plate shown in Figs. 4 and 5. As shown in Figs. 7 and 8, a filtering medium, as for example a sheet 9 of any suitable filter cloth, is interposed between the conduit plate 1 and the drainage plate 11 and when these plates are pressed together, as illustrated in the assembly shown in Figs. 1 and 2, the filtering medium 9 is pressed in sealing contact with the edges of the channels 3 of the conduit plates so that a single continuous channel is formed defined by the walls of the channels 3 in the conduit plate and one surface of the filtering medium 9. The purpose of the ribs 10 in the drainage plate 11 is to act as a support for the filtering medium and to assist in maintaining the surfaces thereof as nearly as possible in the condition of plane surfaces, that is to say, to prevent the swelling or bulging of the filtering medium which would tend to increase unduly the cross section of the conduit channel and also to unduly reduce the available drainage space in the drainage plate.

Referring to the assembly shown in Fig. 1, this assembly is specifically shown in the drawings as arranged for connecting the conduit plates in series so as to provide one single continuous conduit from one end of the filter press skeleton to the other. In the operation of the device as thus shown, a slurry or suspension is fed to the apparatus at the inlet 14. It passes through the conduit channel 3 of one conduit plate 1, entering the conduit channel of one face of that plate at the port 4, leaving the conduit channel of the other face of that plate at the port 5, then passing through the port 16 in the adjacent drainage plate and repeating this process from plate to plate, the thickened material being finally withdrawn from the apparatus at the outlet 17. As the slurry passes at controlled velocity through the velocity conduits 3 in the conduit plates 1, it becomes thickened by partial removal of liquid through the filtering medium 9 in the form of filtrate which passes into the receiving channels 19 (provided with ribs 10) in the drainage plates 11. As shown in Figs. 4 and 5, these channels are inter-connected by means of the cross-connecting channel or tunnel 20 communicating with the receiving channels 19 by holes 21, said tunnel 20 leading to the drainage ports 22, and the filtrate thus collected from the several drainage plates passes through ports 23 in the conduit plates and is withdrawn from the outlet 25. Thus it will be seen that while the walls of the channels 3 in the conduit plates 1 together with one surface of the filtering medium 9 form a single continuous conduit, this is not the case in the drainage plates 11 since the channels 19 in the latter are inter-connected by means of the tunnels 20 to facilitate drainage from said drainage plates.

Figs. 11, 12, 13, 16, 17 and 18 to 23 show various other forms of drainage plates in which the receiving space or reservoir for the filtrate is not a continuous channel.

Referring to Figs. 11 and 12, the drainage plate 30 is provided with a series of parallel channels 31 connected at the ends thereof by cross-connecting canals 32. The port 34 at the upper left hand corner of Fig. 11 is for the purpose of passing partially thickened slurry from the adjacent conduit plate 6 on one side (see Fig. 13) to the adjacent conduit plate on the other side of said drainage plate, while the port 35 shown at the right hand corner of Fig. 11 is for the purpose of withdrawing filtrate. This particular construction is recommended in cases where the drainage plates are made of wood or other material which is not readily cast or molded. Such drainage plates may be employed in assembly with conduit plates having a spiral channel of the type shown in Fig. 6, and a cross section through such an assembly of drainage and conduit plates is shown in Fig. 13. In such a case, in order to more effectively provide for sealing of the edges of the conduit channel by means of the filter medium it is recommended that a screen 37 be interposed between the filter medium 9 and the drainage plate 30, as shown in Fig. 13.

Fig. 16 shows still another form of drainage plate which may be used with any type of conduit plate in accordance with the present invention. As shown in Fig. 17, such a drainage plate 40 is shown for use in connection with a conduit plate of the spiral channel type as shown in Fig. 6. The drainage plate 40 shown in Fig. 16 comprises a series of truncated pyramidal protuberances 41 and corresponding depressions forming receiving spaces 42 for the filtrate. The port 44 at the upper right hand corner of Fig. 16 is for the passage of partially thickened slurry from the port 4 of the conduit plate on one side to the port 5 of a conduit plate on the other side, i. e., one conduit plate to another, and the port 45 at the lower left hand corner of Fig. 16 is provided for the withdrawal of filtrate. In the operation of the assembly shown in Fig. 17 partially thickened slurry enters the port 4 in the conduit plate 1, spirals to the center of one side thereof (see Fig. 6), passes through the center, then spirals outwardly on the other side of said plate to the port 5 and then passes through the port 44 in the drainage plate to the port of entry 4 in the alternate conduit plate. A screen 37 is interposed between the drainage plate 40 and the conduit plate 1.

The form of drainage plate illustrated in Figs. 18 to 23 will be discussed after explaining the conduit plate of Figs. 14 and 15, since those drainage plates have receiving channels which are substantially the mirror image of the conduit channels of the conduit plates of Figs. 14 and 15.

The construction of the drainage plate is subject to a very great degree of variation.

Three specifically different types of drainage plates have been described: (a) the spiral type shown in Figs. 4 and 5 in which the spirals have channels which are substantially the mirror image of the channels in the conduit plate; (b) a series of straight parallel channels as illustrated in Figs. 11 and 12; and (c) a series of inter-connected spaces formed by pyramidal protuberances. Forms (a) and (c) are particularly adapted where the drainage plate is made from readily castable material such as metals, whereas form (b) is better adapted for materials not subject to casting or molding.

One form of conduit plate has been specifically described in connection with the description of Figs. 6, 7, 8, 9 and 13 to 17, to wit: the spiral form of channel. As already stated, this is the form which it is preferred to use when dealing with materials which can be cast. Another form of conduit plate is illustrated in Figs. 14 and 15 showing opposite faces of a conduit plate 50 made of material which cannot be cast, as for example wood. In this conduit plate 50 the conduit channels are formed of a series of parallel channels 51 connected at the ends to form a single continuous channel. In the operation of apparatus in which such a conduit plate is used, the slurry or suspension enters at the port 53 at the upper left hand corner of Fig. 14, passes to the port 54 at the upper right hand corner of Fig. 14, then through the plate at right angles thereto, thence to the other face of said conduit plate, starting therein at the port 54 at the upper left hand corner, continuing through the parallel channels connected by return bends, and leaving at the port 55 at the upper right hand corner of Fig. 15, ports 53 and 55 being separated by a web as shown by the shaded area. The port 56 shown in the lower right hand corner of Fig. 14 and the lower left hand corner of Fig. 15 is provided for the passage of filtrate collected from the drainage plates which may be employed in conjunction with the conduit plates shown in said Figs. 14 and 15.

A conduit plate of the type shown in Figs. 14 and 15 may be employed in conjunction with any of the drainage plate types shown herein or any other suitable drainage plate.

Figs. 18 to 23 show the conduit plates of Figs. 14 and 15 in conjunction with drainage plates, this assembly being useful where all the plates, both conduit and drainage, are made of wood and making unnecessary resort to screens between the drainage plate and filtering membrane.

In the drainage plate 60 of Figs. 18 and 19 there are a series of filtrate receiving channels 61 in each face of the plate, the channels of each face being connected at the ends and also being cross-connected by the tunnel into which drains the filtrate from the channels on both faces through drain holes 64. The tunnels on the several plates are manifolded into a common filtrate manifold formed by the juxtaposition of the ports 66 of the drainage plates and the ports 56 on the conduit plates (see Fig. 21), it being noted that Fig. 21 is a section on line 21—21 of Fig. 19 and also on lines 21—21 of Figs. 14 and 15. Ports 68 register with ports 53 and 55 (see Figs. 14, 15 and 20) and serve to carry slurry from one conduit plate to another conduit plate. Since the channels 61 of Figs. 19 and 20 are substantially in mirror image relation to the channels 51 of Figs. 14 and 15, the ribs 70 serve to effect pressure-sealing of the filter membrane 9 with the edges of the walls of the channels 51 so as to create a continuous conduit channel in the conduit plate 50.

The pressure-sealing effect may be obtained by mounting the desired number of plates in the filter press skeleton 72 with filtering membranes intervening between each pair of faces of a conduit plate and its adjoining drainage plate and then pressing the plates together by the screw 72

I claim:

1. Apparatus for the fractional removal of liquid from a suspension of solids in liquids comprising a series of plates in face-to-face relation, each alternate plate having therein a central web and means extending from each side thereof and constituting a continuous channel partly defined by walls terminating in edges, the axis of said channel being substantially parallel to the face of said plate; a filter medium adapted when in sealing contact with the edges of said channel to form a continuous conduit defined by the walls of said channel and a surface of said filtering medium; means to maintain said filter medium in liquid-tight sealing contact with the edges of said channel; means to continuously pass through and remove from said continuous conduit a liquid containing solids in suspension therein; and means in an adjacent plate to receive filtrate from said conduit.

2. A plate for use in apparatus for the fractional removal of liquid from a suspension of solids in liquids, said plate having therein a central web and ribs extending from each side thereof and constituting a continuous channel partly defined by walls terminating in edges, the axis of said channel being substantially parallel to the face of said plate, said edges and walls being adapted by liquid-sealing contact of said edges with the surface of a sheet of filtering medium to form a single continuous conduit defined by said walls and said surface.

3. Apparatus for the fractional removal of liquid from a suspension of solids in liquids comprising a series of plates arranged in face-to-face relation in a filter press skeleton, said plates being arranged transversely in relation to an axis passing through the center of each plate; a filtering membrane between adjacent plates; means in each alternate plate, including a central web and means extending from each side thereof, and forming with said filtering medium a continuous duct partly defined by a surface of said filtering membrane; means to pass through said duct a suspension of solids in a liquid in pressure contact with said filtering membrane and to pass through said membrane, as filtrate, a fractional part of said liquid and to discharge from said duct a thickened suspension; and means in each plate adjacent to said each alternate plate to receive said filtrate separate from said thickened suspension.

4. Apparatus for the fractional removal of liquid from a suspension of solids in liquids comprising a series of plates arranged in face-to-face relation in a filter press skeleton, said plates being arranged transversely in relation to an axis passing through the center of each plate; means in each alternate plate, including a central web and means extending from each side thereof, to pass said suspension as a confined continuous stream in a path transverse to said axis; means to effect a continuous fractional separation of the liquid in said stream during its passage in said path, in the form of filtrate; and means in each plate adjacent to said each alternate plate to receive said filtrate.

5. Apparatus for the fractional removal of liquid from a suspension of solids in liquids comprising a series of plates in face-to-face relation, each alternate plate having a central web and ribs extending from each side thereof and forming a continuous channel partly defined by walls terminating in edges, the axis of said channel being substantially parallel to the face of said plate; a filter medium adapted when in sealing contact with the edges of said channel to form a continuous conduit defined by the walls of said channel and a surface of said filtering medium; means to maintain said filter medium in liquid-tight sealing contact with the edges of said channel; means to continuously pass through said conduit a liquid containing solids in suspension therein at a controlled velocity to sweep said surface of the filter medium clear of solid matter tending to deposit thereon; means in an adjacent plate to receive filtrate from said conduit and means in said plate to support the filtering medium.

6. Apparatus for the fractional removal of liquid from a suspension of solids in liquids comprising a series of plates arranged in face-to-face relation in a filter press skeleton, said plates being arranged transversely in relation to an axis passing through the center of each plate; a filtering membrane between adjacent plates; means in each alternate plate, including a central web and means extending from each side thereof, and forming with said filtering medium a continuous duct partly defined by a surface of said filtering membrane; means to pass through said duct a suspension of solids in a liquid in pressure contact with said filtering membrane at a velocity controlled to sweep said surface of the filtering medium clear of solid matter tending to deposit thereon and to pass through said membrane, as filtrate, a fractional part of said liquid and to discharge from said duct a thickened suspension; means in each plate adjacent to said each alternate plate to receive said filtrate separate from said thickened suspension and means associated with said filtrate receiving means to support said filtering medium.

7. Apparatus for thickening a suspension of solids in liquids comprising a series of conduit plates alternating with a series of drainage plates; a filtering medium interposed between each pair of conduit and drainage plates; each conduit plate having therein a central web and means extending from each side thereof and forming a continuous channel partly defined by walls terminating in edges, the axis of the channel being substantially parallel to the face of the plate; said walls forming with the filtering medium a continuous conduit defined by said walls and a surface of the filtering medium; each drainage plate having therein channeled parts adapted to receive filtrate from said conduit and to maintain said filter medium in liquid sealing contact with the edges of the channel in the conduit plate and thereby maintain the continuity of said conduit and other means to support said filtering medium; means to pass said suspension through said conduit at a controlled velocity to sweep the surface of said filter medium free of solid matter tending to deposit thereon and discharge a thickened suspension therefrom separate from said filtrate.

8. Apparatus for thickening a suspension of solids in liquids comprising a series of conduit plates alternating with a series of drainage plates; a filtering medium interposed between each pair of conduit and drainage plates; each conduit plate having therein a central web and means extending from each side thereof and forming a continuous channel partly defined by walls terminating in edges, the axis of the channel being substantially parallel to the face of the plate; said walls forming with the filtering medium a continuous conduit defined by said walls and a surface of the filtering medium; each drainage plate having channeled means therein adapted to receive filtrate from said conduit, said means having walls terminating in edges, said edges being complementary to the edges of the channel in the adjacent conduit plate and being adapted to maintain said filter medium in liquid sealing contact with the edges of the channel in the conduit plate; and means to pass said suspension through said conduit at a controlled velocity to sweep the surface of said filter medium free of solid matter tending to deposit thereon and discharge a thickened suspension therefrom separate from said filtrate.

9. A pair of plates for use in apparatus for the fractional removal of liquid from a suspension of solids in liquids, one of said plates having a central web and ribs extending from each side thereof, said ribs forming a pair of continuous channels lying on opposite sides of said central web, said channels communicating with each other and forming a single continuous channel partly defined by walls terminating in edges, said edges and walls being adapted by liquid-sealing contact of said edges with the surfaces of a sheet of filtering medium to form a single continuous conduit defined by said walls and said surface, the other plate having channels therein adapted to receive filtrate from said conduit, said channels having walls terminating in edges, said edges being adapted to maintain said filter medium in liquid-sealing contact with the edges of the channel in the first named plate, and means in the channels of the second named plate to support the filter medium.

10. Apparatus for the fractional removal of liquid from a suspension of solids in liquids comprising a series of plates in face-to-face relation, each alternate plate having therein a continuous channel partly defined by walls terminating in edges, the axis of said channel being substantially parallel to the face of said plate; a filter medium adapted when in sealing contact with the edges of said channel to form a continuous conduit defined by the walls of said channel and a surface of said filtering medium; means to maintain said filter medium in liquid-tight sealing contact with the edges of said channel; means to continuously pass through and remove from said continuous conduit a liquid containing solids in suspension therein; and means in an adjacent plate to receive filtrate from said conduit; said plates being divided into a series of groups, the members of each group being connected in parallel and the groups as a whole being connected in series.

CARL A. JAHREIS.